US010558818B2

(12) United States Patent
Goyal et al.

(10) Patent No.: US 10,558,818 B2
(45) Date of Patent: Feb. 11, 2020

(54) SUPPORTING SECURITY ACCESS CONTROLS IN AN OVERLAY FILESYSTEM

(71) Applicant: Red Hat, Inc., Raleigh, NC (US)

(72) Inventors: Vivek Goyal, Westford, MA (US); Daniel Walsh, Westford, MA (US); David Howells, Farnborough (GB); Miklos Szeredi, Budapest (HU)

(73) Assignee: Red Hat, Inc., Raleigh, NC (US)

( * ) Notice: Subject to any disclaimer, the term of this patent is extended or adjusted under 35 U.S.C. 154(b) by 126 days.

(21) Appl. No.: 15/439,433

(22) Filed: Feb. 22, 2017

(65) Prior Publication Data
US 2018/0239921 A1  Aug. 23, 2018

(51) Int. Cl.
*G06F 21/62* (2013.01)

(52) U.S. Cl.
CPC .............................. *G06F 21/6227* (2013.01)

(58) Field of Classification Search
None
See application file for complete search history.

(56) References Cited

U.S. PATENT DOCUMENTS

| | | | |
|---|---|---|---|
| 6,931,530 B2 | 8/2005 | Pham et al. | |
| 7,197,516 B1 * | 3/2007 | Hipp | G06F 17/30067 |
| 7,565,532 B2 | 7/2009 | Pham et al. | |
| 7,877,426 B2 | 1/2011 | Grubbs et al. | |
| 7,890,554 B2 | 2/2011 | Brown et al. | |
| 7,917,751 B2 * | 3/2011 | Keohane | G06F 17/30067 713/153 |
| 9,203,903 B2 * | 12/2015 | Sumrall | G06F 21/00 |
| 9,342,254 B2 | 5/2016 | Kamath et al. | |
| 2004/0078568 A1 * | 4/2004 | Pham | G06F 21/6218 713/165 |
| 2004/0107342 A1 * | 6/2004 | Pham | G06F 3/0622 713/165 |
| 2011/0138174 A1 * | 6/2011 | Aciicmez | G06F 21/6272 713/165 |

OTHER PUBLICATIONS

Erez Zadok, "Stackable File Systems as a Security Tool", Computer Science Department, Columbia University, CUCS-036-99, 19 pages.
Neil Brown, "Overlay Filesystem", Nov. 28, 2016, 4 pages https://www.kernel.org/doc/Documentation/filesystems/overlayfs.txt.
"Where do the files go if you mount a drive to a folder that already contains files?", Unix & Linux Stack Exchange, Nov. 29, 2016, 1 page (http://unix.stackexchange.com/questions/41336).

* cited by examiner

*Primary Examiner* — Fatoumata Traore
(74) *Attorney, Agent, or Firm* — Lowenstein Sandler LLP

(57) ABSTRACT

An implementation of this disclosure provides a system comprising memory to store a plurality of layers and a processing device coupled to that memory to set up the layers and to mount them into an overlay. The layers comprise an upper and one or more lower layers. The overlay provides access to a plurality files stored in the overlay filesystem. A request from an application to access a file in the mounted overlay is received. An access policy for the mounter that mounted the layers is identified in view of the mounter's credentials. The processing device checks, in view of the access policy, whether a security context label for the file provides access to the application and to the mounter of the overlay in at least one lower layer comprising the file. An instruction to provide the application with access to the file is issued in view of the check.

20 Claims, 5 Drawing Sheets

US 10,558,818 B2

SUPPORTING SECURITY ACCESS CONTROLS IN AN OVERLAY FILESYSTEM

TECHNICAL FIELD

The implementations of the disclosure relate generally to filesystems and, more specifically, relate to supporting security access controls in an overlay filesystem.

BACKGROUND

An overlay file system is a filesystem that is mountable to a non-terminal node in a directory tree structure of another file system. As such, from a client's perspective of overlay file system, the respective directory trees corresponding to two or more file systems appear as a single merged directory tree.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
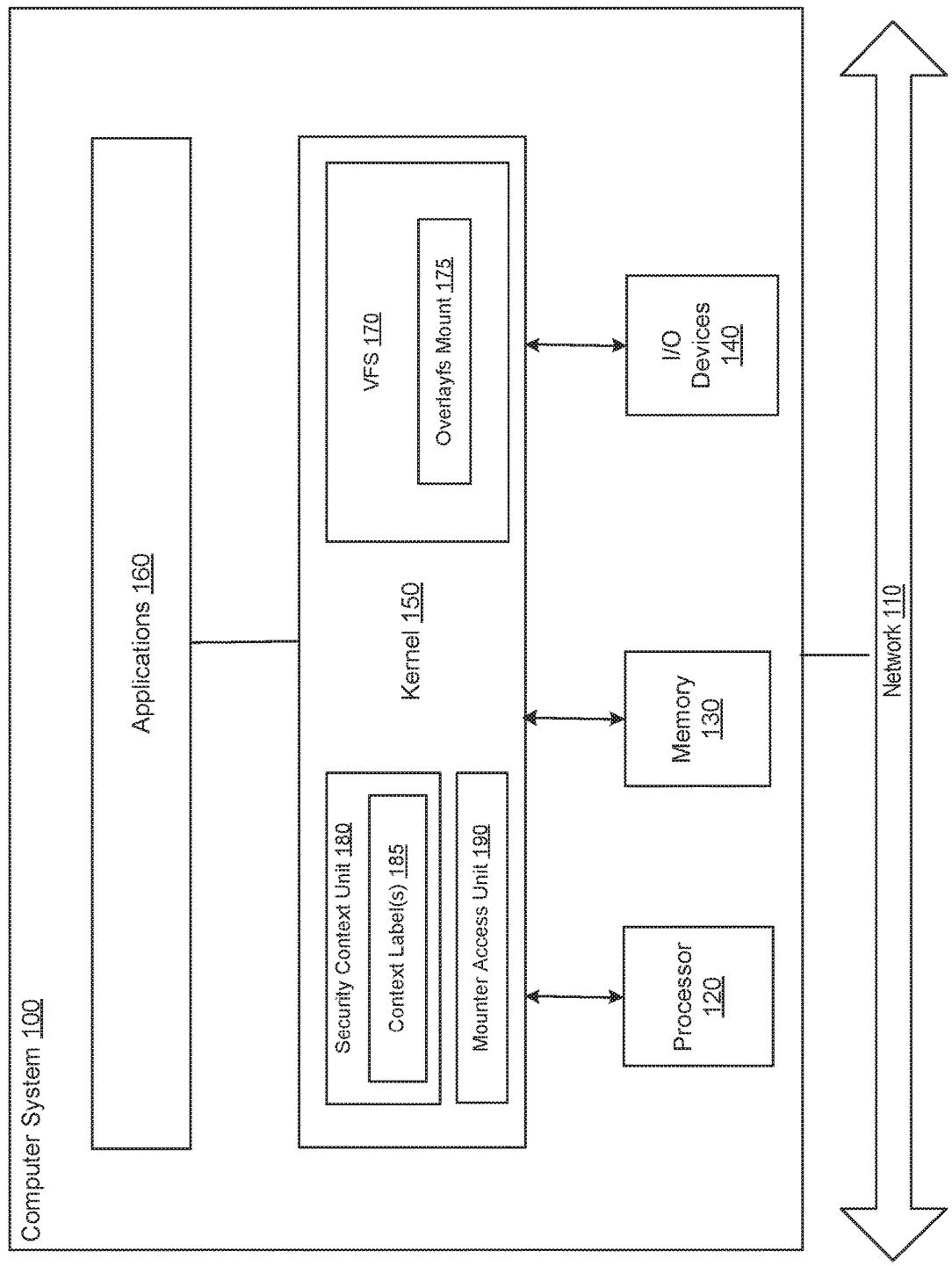
FIG. 1 is a block diagram of a system for supporting security access controls in an overlay filesystem in which implementations of the disclosure may operate.

An overlay filesystem is a filesystem that is the result of overlaying one filesystem on top of another filesystem. For example, one filesystem may be mounted atop of another, with the contents of each filesystem appearing to be in a single filesystem encompassing both. In some cases, the overlay filesystem may include an "upper" filesystem and a "lower" filesystem. In such cases, changes made to the overlay filesystem are reflected in the "upper" filesystem, but the "lower" filesystem is treated as read-only.

The overlay filesystem can provide multiple transparent layers of directories and files. In some implementations, the overlay filesystem is implemented by way of a specific filesystem module, such as an overlay filesystem module (overlayfs), residing at the kernel. When an overlay filesystem is created by a mount, one directory of the overlay filesystem is mounted on top of another. At this point, the mounted overlay filesystem is accessible by all of the processes with the same filesystem namespace. The overlay filesystem view is constructed by successively stacking a number of directories (e.g., layers) on top of each other and presenting to the file system client the composite view of all layers as seen from above. As layers/directories are overlaid via the overlay filesystem, the contents of each layer are presented as a union of the overlapping layers. If more than one layer has the same entry (e.g., file) in the same layer, the topmost version of that entry is the only version that is presented. For example, the upper layer may contain "whiteouts" that block the visibility of entries in the lower layers to any process trying to access them.

The overlayfs is a loadable kernel module that superimposes multiple layers into a single virtual view for running applications. In some implementations, the view may be comprised of a two-tiered (e.g., upper and lower) layer of file systems, where upper layer is a writable layer and the lower layer is a read-only layer. In this regard, modifications to files are kept in the upper layer and a read-only representation of the files is visible on the lower layer. If, however, the same file exists in both layers, the file in the upper layer blocks the view of the lower layer, and the file on the upper layer is presented to the running applications.

A system may implement a kernel security module (e.g., mandatory access controls (MAC)) to provide a system access control policy that restricts the running application's access to certain resource objects of the system, such as data files, directories, devices, etc. These access controls provide isolation for local application processes to prevent them from interfering with each other. An example of such a kernel security module is Security-Enhanced Linux (SELinux) that may provide a mechanism for supporting access control security policies, such as MAC, by attaching a security context label (e.g., string or text) to a resource that is used to determine access by specific applications.

The security context labels attached to the resources are tokens that the MAC uses to match with particular policy rules. For example, each "object" (e.g., file, directory, etc.) in the overlay is given a label. Each of the objects may be accessed in a number of ways (e.g., read, write, execute, etc.). Further, a "subject" such as an application process may access the objects. Each subject is also assigned a security context label. As a result, the access control policy may take the form of a set of rules that dictates what type of accesses any particular subject (e.g., application process) may have on any particular object based on their respective security context labels. A label-based MAC policy may be a set of rules that say: subject-label acting-on object-label has certain specified access-rights. For example, a web process labeled as web_t attempting to read a file that is labeled web_content_t, the policy would need to have a rule like allow web_t web_content_t:file read to allow this to take place.

With an overlay file system, the objects can have different labels on the different layers. By the overlay will typically use the label of the object that is actually read. When an application attempts to access a security context labeled resource object, the kernel may deny access unless there is a policy rule permitting the application access that matches the security context labels associated with the application process and the resource object. When an application writes to an existing object, the copy-up operation will maintain the label from the lower directory to the upper. If a new object is created, the object will be created in the upper directory subject to the standard way that the MAC policy defines for newly created objects, governed by the MAC policy allowing the applications with the subject label to create objects with the new label. In some situations, the security context labels can be implemented in the overlay filesystem—and a file seen through an overlay may have several labels. Firstly, a label is assigned by the mounted overlay filesystem to the virtual files that exist within it; secondly, a label is assigned to the corresponding file in the upper layer; and, thirdly, a label is assigned to the corresponding file in the lower layer.

When a file is read by a particular process, a MAC security check has a choice of object labels to use, however, each label may grant or deny different accesses. For example, if an overlay includes a directory on the lower layer that comprises files A and B, the kernel security module can be executed (for example, by an admin user) to put security context labels on the two files. In one example, when the kernel security module is executed, a security context label can be placed on A that makes the file readable a certain application process and another security context label can be placed on B that makes this file not readable by the application process.

Overlay file systems with MAC support also allow for the concept of a context mount. The admin or "mounter" process has the ability to mount an overlay and assign a single label to the all objects in the mount point. For example, the mounter may mount an overlay file system with a context mount that says all content is web_content_t.

In view of the above, several issues may arise when the security context labels are implemented in the overlay filesystem. For example, in the overlay filesystem, the "mounter" process can execute a kernel command to generate an overlayfs mount of the directory comprising files A and B to a location using an overlay. One problem in doing so is that by mounting an overlay over the directory, the mounter can add security context labels in the overlay directory that make the lower directory accessible to another user or application process. These labels are attached to the corresponding virtual files in the overlay filesystem, and if the MAC security check only checks those, the labels on the lower layer are ignored. For example, the directory may be on the upper layer of the overlay. The mounter can then set security context labels on the virtual directory that are different than the security context label on files A and B as they exist in the lower layer. As a result, the mounter can compromise the access control security policies of the system by providing access to files using the overlayfs mount that the mounter is not able to otherwise access because of the context label of the mounter. Moreover, although the mounter may be not be able to read the file in the lower layer directly, the mounter can now make the file available to itself by providing a new context label for the virtual file in the overlay filesystem itself further thwarting the access control security policies implemented by the system.

Implementations of the disclosure address the above-mentioned and other deficiencies by providing support for security access controls in the overlay filesystem. This may prevent an application process or user from accessing a file (e.g., via overlayfs mount) that it should not otherwise be able to access because of the process' security context label. In some implementations, the security access control system is updated with a processing unit installed in the kernel to add an additional check to determine whether the mounter of an overlayfs mount has access to files in a underlying (lower/upper) layer of the overlay filesystem rather than just checking the security context label of the application process/user with respect to the virtual overlayfs layer. If the mounter does not have access to certain files in a lower layer of an overlayfs mounted directory, this means that mounter of the overlay filesystem may be improperly extending their access to the underlying filesystem to other users of the overlay.

In some implementations, the processing unit checks that the mounter has access to the underlying files before providing access to the files to another application process or user. For example, when the mounter executes an overlayfs mount for a directory comprising the files, credentials of the mounter are recorded by the processing unit. These credentials may include information that indicates which files the mounter has access to in the directory based on the context labels of the mounter and the files in that directory. The credentials are recorded for as long as the directory is overlayfs mounted. So when another process is attempting to access the files through the overlayfs mount, the processing unit performs an additional "check" of the credentials of that process to determine which files of the (lower layer) directory are accessible to the process.

If the mounter credentials allow access the file that the process is attempting to access, it may be provided with access by the kernel. Otherwise, the process may be thrown an error alert indicating that the file is not accessible due to the security context label of the mounter of the overlayfs mount. Thus, an advantage of using the techniques disclosed herein is that it helps prevent the mounter from using the overlay filesystem to thwart or circumvent any implemented security context controls.

FIG. 1 is a block diagram of a system 100 for supporting security access controls in an overlay filesystem in which implementations of the disclosure may operate. As shown, the computer system 100 may be coupled to a network 110 and include a processor 120 communicatively coupled to a memory 130 and an input/output I/O device 140.

"Processor" herein refers to a device capable of executing instructions encoding arithmetic, logical, or I/O operations. In one illustrative example, a processor may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). The processor 120 may also be referred to as a central processing unit (CPU). "Memory" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data. Although, for simplicity, a single processor 120 is depicted in FIG. 1, in some other embodiments computer system 100 may comprise a plurality of processors. Similarly, in some other embodiments computer system 100 may comprise a plurality of I/O devices, rather than a single device 140.

The computer system 100 may be a server, a mainframe, a workstation, a personal computer (PC), a mobile phone, a palm-sized computing device, etc. The network 110 may be a private network (e.g., a local area network (LAN), a wide area network (WAN), intranet, etc.) or a public network (e.g., the Internet). Computer system 100 may run a kernel 150 that manages the hardware resources of the computer system and that provides functions such as inter-process communication, scheduling, memory management, and so forth. In some implementations, the kernel 150 can take many forms. For example, the kernel 150 may be a software component, such as a "host" operating system executed by the processor 120. In other implementations, the kernel 150 may be a hypervisor also referred to as a virtual machine monitor. The hypervisor may be part of or incorporated in the host operating system of computer system 100, or the hypervisor may be running on top of the host operating system. Alternatively, the hypervisor may a "bare metal" hypervisor that runs on hardware of computer system 100 without an intervening operating system.

The kernel 150 may support a plurality of applications 160 residing on the computer system 100. These applications 160 may include, for example, user application processes, virtual machines, containers and the like. In some implementations, the kernel 150 is a central component of system 100, as it is a bridge between the applications 160 and the actual data processing done at a hardware level of the system 100. The kernel's 150 responsibilities include managing the system's 100 resources (the communication between hardware and software components). The kernel 150 can provide the lowest-level abstraction layer for the resources (especially the processor 120, memory 130 and I/O devices 140) that the applications 160 may control to perform their function. The kernel 150 typically makes these resources available to the applications 160 through inter-process communication mechanisms and system calls.

In some implementations, computer system 100 supports an overlay filesystem. For example, the overlay filesystem may reside in the kernel 150, and is plugged into a virtual filesystem subsystem (VFS) 170. In some implementations, the overlay filesystem includes two layers, an upper layer and a lower layer (not shown) that are merged together as a single virtual filesystem 170 via an overlayfs mount 175. In some implementations, the layers at the overlayfs mount 175 may include more than two layers of overlay files system. Each layer may include one or more directories. Each directory may include files and/or other directories. When the upper and lower layers of the overlay filesystem are merged together at the overlayfs mount 175, the files and directories of the upper and lower layers are present to the applications 160 as belonging to the same filesystem.

The lower layer, in implementations, is included into the single merged overlayfs mount 175 as read-only, while the upper layer is mounted read-write into overlayfs mount 175 as an overlay on top of the lower layer. The overlayfs includes logic so that each virtual file acts as a switch in that any requests to modify that object in the merged filesystem are redirected to the upper layer regardless of whether there is an underlying representation of the same file in the lower layer. In other words, the overlay filesystem may be a union view of a stack of layers divided between the one "upper layer" at the top and one or more "lower layers" beneath. File, directory and whiteout objects on different layers in the stack correspond if they have the same parent directory and the same name. An overlay directory shows the set union of all corresponding directories in the stack that aren't blocked. New files and directories get stored in the upper layer while read-only access is provided to files in the lower layers. Modifications to files that are otherwise only in the lower layers, cause that file to be copied up to the upper layer and then the changes are applied to the upper layer copy. This then blocks off access to the file in the lower layer. Deletions of files that have only exist in the lower layers result in whiteouts being written to the upper layer to block off access.

In some embodiments, computer system 100 may provide isolation for the application processes to prevent them from interfering with each other or the physical layer of the system 100. In one embodiment, system 100 may include a security context unit 180 implemented in the kernel 150. The security context unit 180 may include logic implemented as software, firmware, and hardware or in any combination thereof. In some embodiments, the security context unit 180 may implement certain access control methods to isolate local processes associated with the applications 160 from accessing with each other's assigned resources. For example, the security context unit 160 may be adapted to generate unique context labels 185 for resources associated with a corresponding application process. Each of the context labels 185 may be used to identify one of the applications 160. In this regard, the kernel 150 may assign a unique security context label generated by the security context unit 185 to each application when that the applications is executed.

In some embodiments, the kernel 150 can enforce a (MAC) security policy for the applications 160 based on the context labels 185. For example, each context label may be used to label a type of resource to enforce a security context policy (e.g., a set of administrative rules in a data structure) for authorizing or rejecting access to that resource by the applications 160. The security context policy indicates what type of access rights that the application has for a specified resource. In some embodiments, the kernel 150 may re-label a reference name of a resource to include one of the context labels 185 for a particular application to indicate that the resource is assigned to that application. Once the resource is labeled by the kernel 150, the kernel 150 can apply the security context policy for authorizing or rejecting access by the applications 160 to the labeled resources.

To apply the security context policy, the kernel 150 may check the security context label of an application when that application attempts to access a resource of system 100. In such cases, the kernel 150 may use the security context policy to identify certain access rights that the application has for the resource it is attempting to access. The kernel 150 validates the application's right to access the resource by determining whether the security context labels associated with the application and the resource corresponds to what is in the security context policy. For example, the kernel 150 may determine whether the security context label is assigned to the application and that the access privileges (e.g., read, write, execute, etc.) associated with the resources corresponds with the access privileges of the application's request. If the kernel 150 validates the access privileges of the application, then a response may be generated by the kernel 150 authorizing the request of the application. Otherwise, the kernel 150 may generate a rejection response to the request of the application to access the resource.

In some implementations, a process also referred to as a "mounter" process may execute a kernel command to mount overlay 175 onto to a location associated with the VFS 170. In this regard, the mounter can add security context labels to the overlay filesystem that makes it accessible to another user or application process. For example, when the mounter executes a kernel command to mount an overlayfs filesystem, they are permitted to specify a label that will be applied to all files therein. When using the overlay filesystem, however, the overlayfs module uses the security context label of the application process to access files in the mounted overlay 175, rather than the context label of the mounter process that mounted the overlay.

As a result, however, the mounter can compromise the access control security policies of the system in two ways, firstly by providing access to files using the mount that the mounter would not otherwise be able to access, and secondly, by blocking an application's access to files it should be able to access. For example, virtual directories and files are created in the overlay filesystem that correspond to objects (physical directories, files, etc.) found in the layer stack. These virtual directories and files are used to manage access to the real (e.g., physical) objects. Each object in the layer stack has a label and each virtual object in the overlay filesystem also has a label. The overlay filesystem, then has a security context label in the overlay 175 and security context labels on the underlying objects that correspond to it. In this regard, a MAC policy lookup may only use one object label to determine access to an object, but there may be more than one to choose from, such as one from the overlay 175 and one from the application process acting on the object. One approach is to use the object label from the overlay file and the application process subject label to determine a MAC rule. This may mean, however, that the application process may gain access that it shouldn't have to the lower layer objects because the lower layer object label are not checked.

In accordance with implementations, the kernel 150 of system 100 may include mounter access unit 190 that is installed to provide support for security context labeling used with an overlay filesystem. In some implementations, the mounter access unit 190 may determine whether an application process should gain access to a file by checking that a subject context security label of the application process against the overlay's object context security label as well as whether the subject context security label of the mounter that mounted the overlayfs mount 175 provides access to files in a lower layer of the overlay filesystem. The functionally of the mounter access unit 190 can exist in a fewer or greater number of modules than what is shown, with such modules residing at one or more components of system 100, which may be geographically dispersed. The mounter access unit 190 may be operable in conjunction with the kernel 150 from which it may receive and determine relevant information regarding layers associated with the overlay filesystem as discussed in more detail below.

Figure 2:
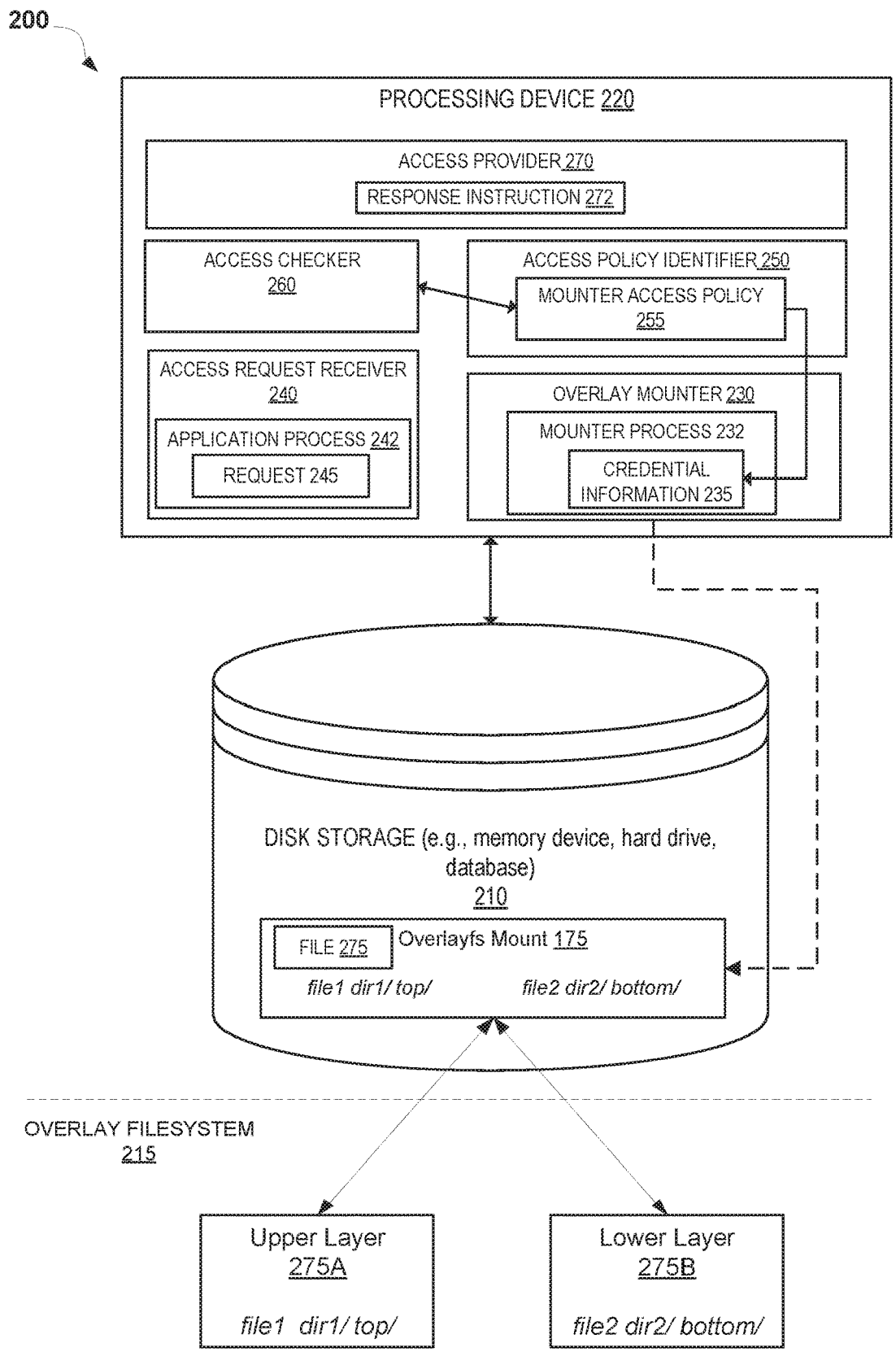
FIG. 2 is a block diagram of an apparatus including a memory for supporting security access controls in an overlay filesystem according to an implementation of the disclosure.

FIG. 2 is a block diagram of an apparatus 200 including a memory 210 according to an implementation of the disclosure. The apparatus 200 may be the same or similar to a components within the computer system 100 of FIG. 1. In some implementations, the apparatus 200 may be installed in a kernel, such as the kernel 150 of FIG. 1. Apparatus 200 may include components for supporting security access controls in an overlay filesystem 215. In some implementations, the apparatus 200 may include a disk storage 210 (which may be compared to the memory device 130 of FIG. 1) and a processing device 220 (which may be compared to the processing device 120 of FIG. 1) coupled to the disk storage 210. In some implementations, the processing device 220 may execute instructions for carrying out the operations of the apparatus 200 as discussed herein. As shown, the apparatus 200 may execute instructions for an overlay mounter 230, an access request receiver 240, an access policy identifier 250, an access checker 260, and an access provider 270 to provide access to a file 275 in a mounted layer of the overlay filesystem 215 based on the credentials associated with a mounter of that layer.

Disk storage 210 may include any non-persistent data storage (e.g., memory), persistent data storage (e.g., flash storage, hard drive, tape), other medium, or combination thereof that is capable of storing instructions for carrying out the operations of the apparatus 200 discussed herein. In some implementations, the storage device 210 may store an overlay of layers associated with the overlay file system 215. In one implementation, the overlays may be mounted to an overlayfs mount 175 at the disk storage 210. For example, each time a layer of the overlay filesystem 215 is mounted, a copy up from the overlay file system 215 to disk storage 210 occurs, basically creating a cached version of the layer in disk storage 210.

In some implementations, the overlay file system 215 may include a plurality of layers. For example, the overlay filesystem 215 includes at least two layers, an upper layer 275A and at least lower layer 275B (in some implementations lower layer 275B may be a plurality of lower layers) that are mounted together via the overlayfs mount 175. The lower layer 275B is mounted into the overlayfs mount 175 as read-only, while the upper layer 275A is mounted read-write into the overlayfs mount 175 as an overlay on top of the lower layer 275A. The overlay should persistently store changes and allow manipulation of the combined layers.

Each layer (e.g., upper layer 275A and a lower layer 275B) of the overlay filesystem 215 may be a directory. Each directory may include files and/or other directories. For instance, upper layer 275A includes a file1 located in a dir1 and lower layer 275B includes a file2 located in a dir2. When the upper and lower layers 234 are merged together at overlayfs mount 275, the files of the dir 1 and dir 2 are presented to applications as belong to the same file system. The overlay should persistently store changes and allow arbitrary manipulation of the combined namespace.

In some implementations, the apparatus 200 may intercepts I/O requests from applications to access files of the overlay filesystem 215. For example, the apparatus 200, in conjunction with kernel 150 of FIG. 1, may intercept I/O requests from the applications to the overlay filesystem 215. The kernel 150 may route such requests to the appropriate layer of the filesystem. Any requests that modify a file the merged layers at the overlayfs mount 175 are redirected to the upper layer 275A, regardless of whether there is an underlying representation of the same file in the lower layer 275B. The components of the apparatus 200 may access the layers of the overlay filesystem 215 based on the requests from the applications, for example, through inter-process communication mechanisms and system calls of the kernel 150. The apparatus 200 may determine whether the application's request to access the files can be permitted based on a security context label of a mounter process 232 associated with the overlayfs mount 175.

In operation of the apparatus 200, the processing device 220 may execute the overlay mounter 230 to mount layers (e.g., upper layer 275A and lower layer 275B) of the overlay filesystem 215 to an overlay, such as overlayfs mount 175. This overlayfs mount 175 may provide access to a plurality files stored at the overlay filesystem 215 to one or more application associated with the apparatus 200. For example, the mounter process 232 may be associated with application of a user (such as an admin user) to execute a kernel command associated with the overlay mounter 230. In some implementations, the mounter process 232 can add security context labels to a writable upper layer 275 at the overlayfs mount 175 to make files in that layer accessible to another user or application process.

Thereafter, the access request receiver 240 may receive a request 255 from an application process 252 (e.g., one of the applications 160 of FIG. 1) to access a file 275 mounted to the overlayfs mount 175. For example, the access request receiver 240, in conjunction with kernel 150 of FIG. 1, may intercept an I/O request from the application process 252 to the overlay filesystem 215. In some implementations, the application process 252 may request access to the file 275 so that it can modify the file.

In response to the request, the access policy identifier 250 identifies a mounter access policy 255 of a mounter process 232 that mounted the layers to the overlayfs mount 175 in view of the credential information 235. For example, the access policy generator 230 may identify the credential information 235 associated with the mounter process 232 that used the overlay mounter 230 to mount the overlayfs mount 175. The credential information 235 may include information (e.g., a context label) that indicates which files the mounter process 232 has access to in the lower layer 275B based on the context labels of the mounter and the files in that layer. The mounter access policy 245 may be a data structure (e.g., a table, array, register, etc.) stored in memory associated with the processing device 220 while the overlayfs mount 175 is mounted.

Once the mounter access policy 255 is identified, the access policy checker 260 checks check, in view of the access policy 255, whether a security context label for the file 275 provides access for the application process 252 and the mounter process 232 in at least one of the lower layers comprising the file 275. For example, the access policy checker 260 identifies a security context label associated with the mounter process 232 based on the mounter access policy 245. This security context label is compared with another security context label associated with the file 275. The access policy checker 260 conducts this comparison of the file 275's label and applications process label 252 and labels of the file in a layer associated with the lower layer 275B that has the file to determine whether the security context labels of the mounter process 232 and the file 275 match. The lower layers associate with lower layer 275B would be searched in order until one was encouraged that had the corresponding file. At that point, the search would be terminated by the access policy checker 260. check, in view of the access policy, whether a security context label for the file provides access for the application process and the mounter process in at least one of the lower layers comprising the file The security context label uniquely identifies a specific security context associated with the mounter process 232. For example, the security context label may indicate a type of access (e.g., read, write, execute, etc.) that the mounter process 232 is allowed on the file 275. In some implementations, the access policy checker 260 may also determines whether the security context label assigned to the mounter process 232 allows the type of access request by the application process.

The access provider 270 generates a response instruction 272 based on the results of the access policy checker 260. For example, if the security context labels of the mounter process 232 and the file 275 match each other and the type of access request by the application process 252 is permitted based on the mounter access policy 245, the access provider 270 may issue an instruction 272 to the kernel 150 to allow the request 255 of the application process 252 to access to the file 275. In turn, the access provider 270 may provide a notification to the application process 252 indicate that it can proceed with accessing the file 275 in accordance with the request 255. If the security context labels of the mounter process 232 and the file 275 are different from each other or the type of access request by the application process 252 is not permitted based on the mounter access policy 245, the access provider 270 may issue an instruction 272 to the kernel 150 to deny the request 255 of the application process 252 to access to the file 275. In such case, the access provider 270 may provide a notification to the application process 252 indicate that it cannot proceed with accessing the file 275 in the manner specified in the request.

Figure 3:
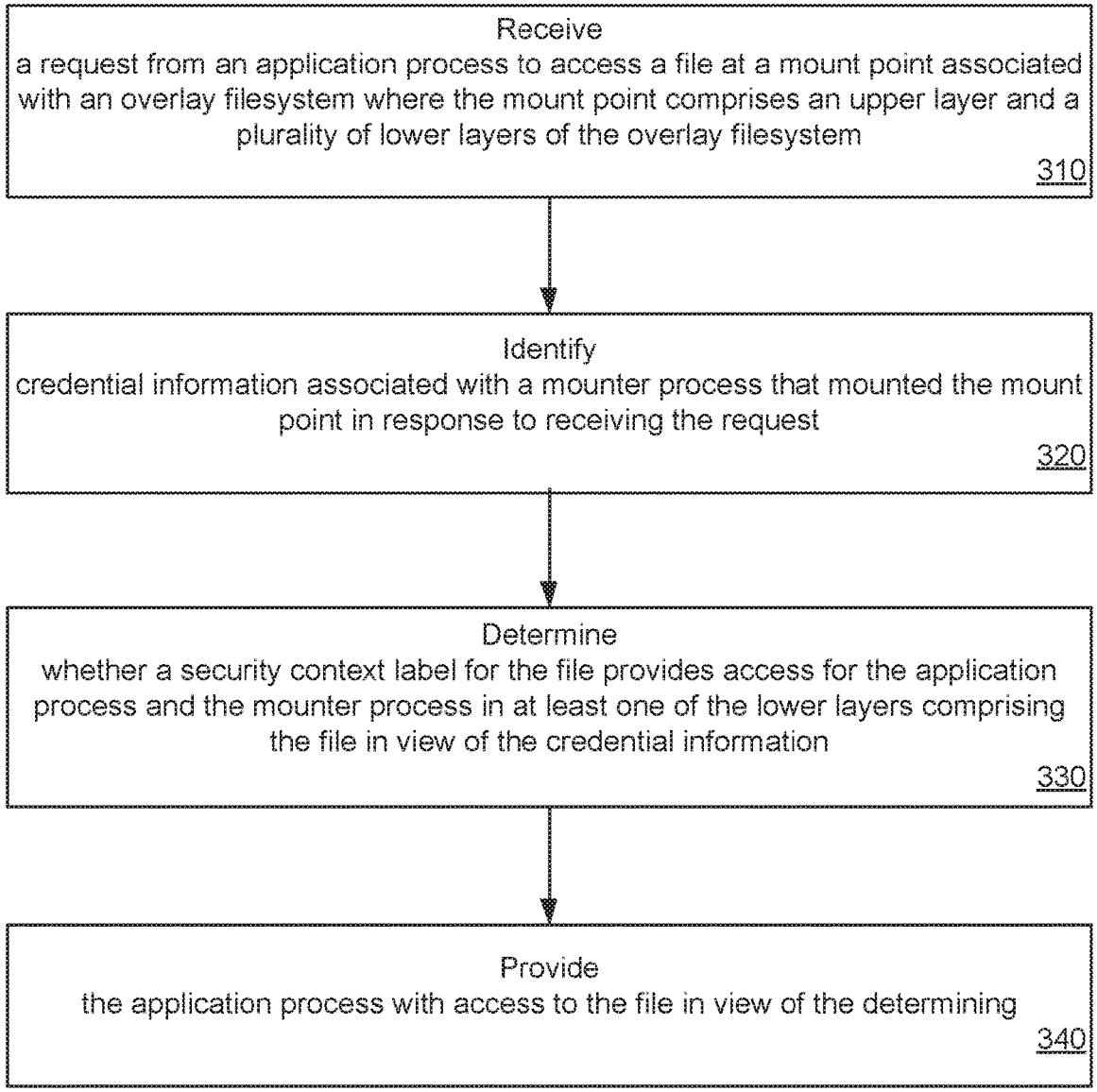
FIG. 3 illustrates a flow diagram illustrating a method for supporting security access controls in an overlay filesystem according to an implementation of the disclosure.

FIG. 3 depicts a flow diagram of one implementation of a method 300 in accordance with one or more aspects of the disclosure. In one implementation, the mounter access unit 190 as executed by the processing device 130 of FIG. 1 or the processing device 220 of FIG. 2 may perform method 300 to support security access controls in an overlay filesystem. The method 300 may be performed by processing logic that may comprise hardware (circuitry, dedicated logic, etc.), software (such as is run on a general purpose computer system or a dedicated machine), or a combination of both. Alternatively, in some other implementations, one or more processors of the computer device executing the method may perform routines, subroutines, or operations may perform method 300 and each of its individual functions. In certain implementations, a single processing thread may perform method 300. Alternatively, two or more processing threads with each thread executing one or more individual functions, routines, subroutines, or operations may perform method 300. It should be noted that blocks of method 300 depicted in FIG. 3 can be performed simultaneously or in a different order than that depicted.

Referring to FIG. 3, at block 310 method 300 receives a request 245 from an application process 242 to access a file 275 at a mount point 175 associated with an overlay filesystem 215. The mount point 175 comprises an upper layer 275A and a plurality of lower layers include lower layer 275B of the overlay filesystem 215. Credential information 235 associated with a mounter process 232 that mounted the mount point 175 is identified in block 320 in response to receiving the request 245. In block 330, is it determined whether a security context label 185 for the file 275 provides access for the application process 242 and the mounter process 232 in at least one of the lower layers 275B comprising the file 275 in view of the credential information 235. In block 340, the application process 252 is provided with access to the file 255 in view of the determining.

Figure 4:
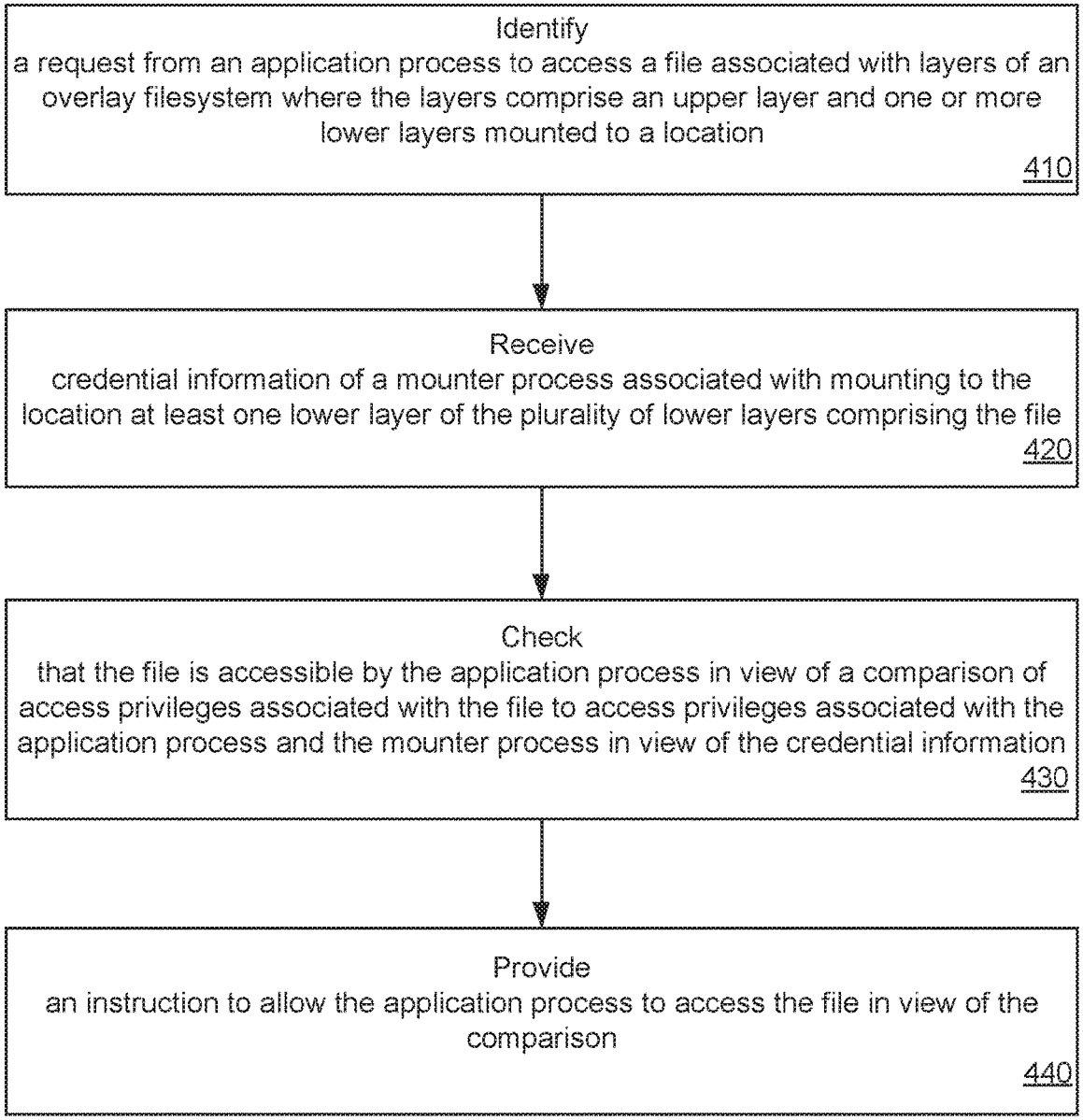
FIG. 4 illustrates a flow diagram illustrating another method for supporting security access controls in an overlay filesystem according to an implementation of the disclosure.

FIG. 4 depicts a flow diagram of one implementation of a method 400 in accordance with one or more aspects of the disclosure. In one implementation, the mounter access unit 190 as executed by the processing device 130 of FIG. 1 or the processing device 220 of FIG. 2 may perform method 400 to support security access controls in an overlay filesystem. The method 400 may be performed by processing logic that may comprise hardware (circuitry, dedicated logic, etc.), software (such as is run on a general purpose computer system or a dedicated machine), or a combination of both. Alternatively, in some other implementations, one or more processors of the computer device executing the method may perform routines, subroutines, or operations may perform method 400 and each of its individual functions. In certain implementations, a single processing thread may perform method 400. Alternatively, two or more processing threads with each thread executing one or more individual functions, routines, subroutines, or operations may perform method 400. It should be noted that blocks of method 400 depicted in FIG. 4 can be performed simultaneously or in a different order than that depicted.

Referring to FIG. 4, at block 410, method identifies a request from an application process 242 to access a file 225 associated with layers of an overlay filesystem 215. The layers comprise an upper layer 275A, and one or more lower layers, including lower layer 275B, mounted to a location 175. In block 420, credential information 235 is received of a mounter process 232 associated with mounting to the location 175 at least one lower layer of the plurality of lower layers comprising the file. In block 430, method 400 checks that the file 255 is accessible by the application process 242 in view of a comparison of access privileges associated with the file 255 in the upper layer 275A and at least one the lower layer 275B comprising the file 225 and access privileges associated with the credential information 235 of the mounter process 232. In block 440, an instruction 272 to allow the application process 242 to access the file 255 in the upper layer 275B is provided in view of the comparison.

Figure 5:
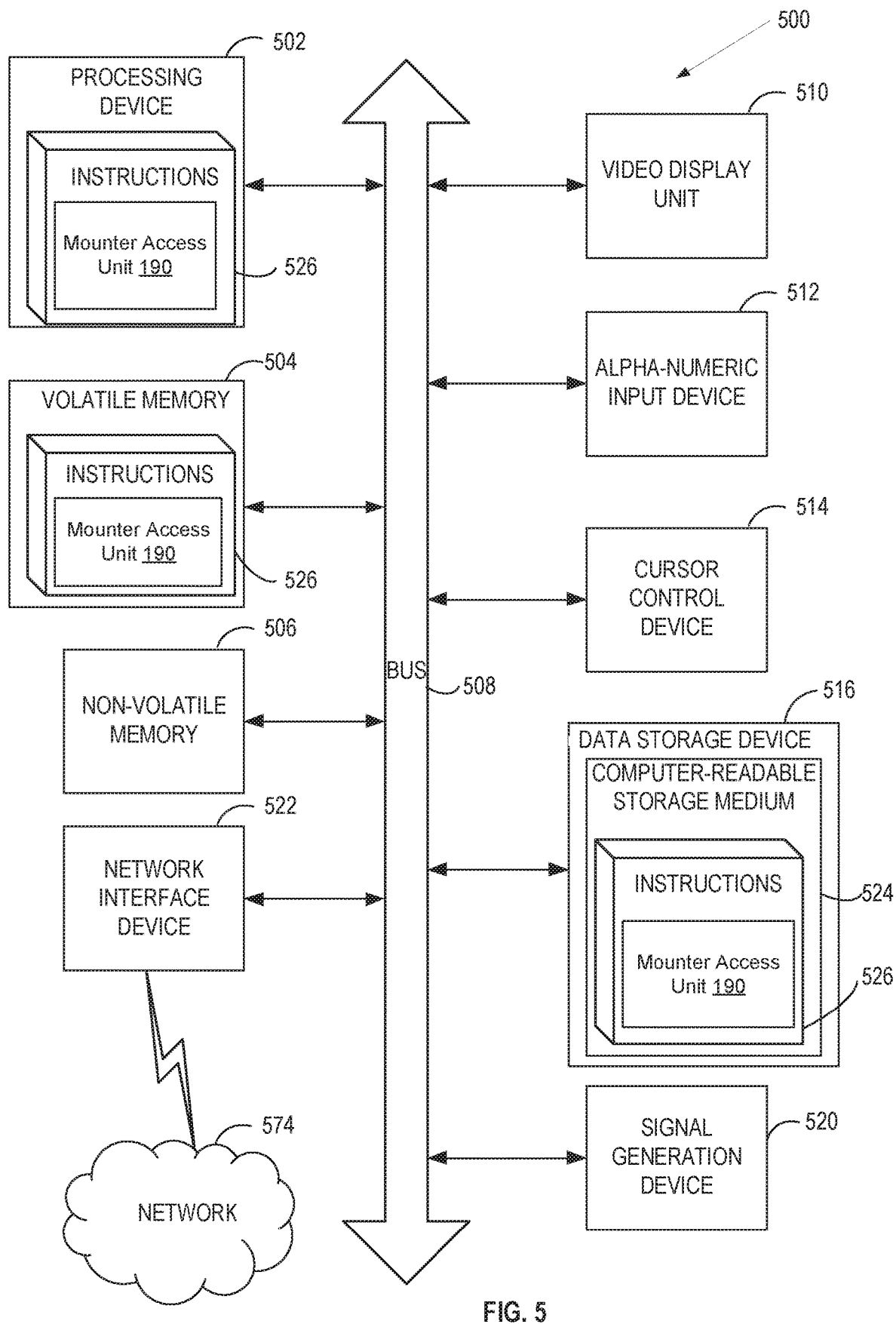
FIG. 5 illustrates a block diagram illustrating a computer system in which implementations of the disclosure may be used.

FIG. 5 depicts a block diagram of a computer system 500 operating in accordance with one or more aspects of the disclosure. In various illustrative examples, computer system 500 may correspond to a processing device within system 100 of FIG. 1 or the apparatus 200 of FIG. 2 respectively. The computer system 500 may be included within a data center that supports virtualization. Virtualization within a data center results in a physical system being virtualized using virtual machines (e.g., applications 110 of FIG. 1) to consolidate the data center infrastructure and increase operational efficiencies.

A virtual machine (VM) may be a program-based emulation of computer hardware of the virtualized data center. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for live storage domain decommissioning.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 610 (e.g., an LCD), an alpha-numeric input device 512 (e.g., a keyboard), a cursor control device 614 (e.g., a mouse), and a signal generation device 520.

Data storage device 516 may include a computer-readable storage medium 524 (e.g., a non-transitory computer-readable storage medium) on which may store instructions 526 encoding any one or more of the methods or functions described herein, including instructions encoding the Mounter Access Unit 190 of FIG. 1 for implementing method 300 of FIG. 3 or method 400 of FIG. 4 for supporting security access controls in an overlay filesystem.

Instructions 526 may also reside, completely or partially, within volatile memory 504 and/or within processing device 502 during execution thereof by computer system 600, hence, volatile memory 504 and processing device 502 may also constitute machine-readable storage media.

While non-transitory computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "determining," "providing," "checking," "identifying," "issuing," "generating" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

It is to be understood that the above description is intended to be illustrative, and not restrictive. Many other implementation examples will be apparent to those of skill in the art upon reading and understanding the above description. Although the disclosure describes specific examples, it will be recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A system comprising:
a memory to store a plurality of layers; and
a processing device, operatively coupled to the memory, to:
mount layers of an overlay filesystem to an overlay, the layers comprise an upper layer and one or more lower layers, wherein the overlay provides access to a plurality of files stored in the overlay filesystem;
receive a request from an application process to access a file in the overlay;
responsive to receiving the request, identify an access policy for a mounter process that is associated with mounting the layers to the overlay in view of credential information for the mounter process;
check, in view of the access policy for the mounter process, whether a security context label for the file provides access for the application process and access for the mounter process in at least one of the lower layers comprising the file, wherein the access for the application process and the access for the mounter process comprise a same type of access to the file; and
responsive to determining that the security context label for the file provides the same type of access for both the application process and the mounter process at the at least one of the lower layers comprising the file, issue an instruction to provide the application process with access to the file.

2. The system of claim 1, wherein the credential information comprises a security context label assigned to the mounter process.

3. The system of claim 1, wherein to check, the processing device is further to:
identify a type of access to the file that is requested by the application process; and
determine whether the security context label assigned to the mounter process authorizes that type of access to the file.

4. The system of claim 3, wherein the processing device is further to, responsive to determining that the security context label assigned to the mounter process allows the type of access to the file requested by the application process, generate a response notification indicating that the application process can access the file.

5. The system of claim 1, wherein to check, the processing device is further to compare a subject security context label assigned to the mounter process with an object security context label associated with the file.

6. The system of claim 5, wherein the processing device is further to, response to determining that the subject security context label matches the object security context label, permit the request of the application process to access to the file.

7. The system of claim 5, wherein the processing device is further to, response to determining that the subject security context label is different from the object security context label, deny the request of the application process to access to the file.

8. A method comprising:
receiving, by a processing device, a request from an application process to access a file at a mount point associated with an overlay filesystem, the mount point comprises an upper layer and a plurality of lower layers of the overlay filesystem;
responsive to receiving the request, identifying credential information associated with a mounter process that mounted the mount point;
determining, by the processing device, whether a security context label for the file provides access for the application process and access for the mounter process in at least one of the lower layers comprising the file in view of the credential information, wherein the access for the application process and the access for the mounter process comprise a same type of access to the file; and
responsive to determining that the security context label for the file provides the same type of access for both the application process and the mounter process at the at least one of the lower layers comprising the file, providing, by the processing device, the application process with access to the file.

9. The method of claim 8, further comprising identifying a security context label assigned to the mounter process in view of credential information.

10. The method of claim 9, further comprising:
identifying a type of access to the file that is requested by the application process; and
determining whether the security context label assigned to the mounter process authorizes that type of access to the file.

11. The method of claim 10, further comprising responsive to determining that the security context label assigned to the mounter process allows that type of access to the file, generating a response notification indicating that the application process can access the file in accordance with the type of access.

12. The method of claim 8, wherein determining whether the security context label for the file provides access for the application process and access for the mounter process in at least one of the lower layers comprising the file in view of the credential information further comprises comparing a subject security context label assigned to the mounter process with an object security context label associated with the file.

13. The method of claim 12, further comprising, response to determining that the subject security context label matches the object security context label, permitting the request of the application process to access to the file.

14. The method of claim 12, further comprising, response to determining that the subject security context label is different from the object security context label, denying the request of the application process to access to the file.

15. A non-transitory computer-readable storage medium comprising instructions that, when executed by a processing device, cause the processing device to:
identify, by the processing device, a request from an application process to access a file associated with layers of an overlay filesystem, the layers comprise an upper layer and one or more lower layers mounted to a location;

receive credential information of a mounter process associated with mounting to the location at least one lower layer of the one or more lower layers comprising the file;

check, by the processing device in view of the credential information of the mounter process, that the file is accessible by the application process in view of a comparison of access privileges associated with the file to access privileges associated with the application process and access privileges associated with the mounter process wherein the access privileges associated with the application process and the access privileges associated with the mounter process comprise a same type of access to the file; and responsive to determining that access privileges for both the application process and the mounter process allow the same type of access to the file at the at least one lower layer, providing, by the processing device, an instruction to allow the application process to access the file.

16. The non-transitory computer-readable storage medium of claim 15, wherein the credential information comprises a security context label assigned to the mounter process.

17. The non-transitory computer-readable storage medium of claim 16, wherein to check, the processing device is further to:
   identify a type of access to the file that is requested by the application process; and
   determine whether the security context label assigned to the mounter process authorizes that type of access to the file.

18. The non-transitory computer-readable storage medium of claim 15, wherein to check, the processing device is further to compare a subject security context label assigned to the mounter process with a object security context label associated with the file.

19. The non-transitory computer-readable storage medium of claim 18, wherein the processing device is further to, response to determining that the subject security context label matches the object security context label, permit the request of the application process to access to the file.

20. The non-transitory computer-readable storage medium of claim 18, wherein the processing device is further to, response to determining that the subject security context label is different from the object security context label, deny the request of the application process to access to the file.

* * * * *